United States Patent [19]
Unterlander et al.

[11] Patent Number: 5,660,902
[45] Date of Patent: Aug. 26, 1997

[54] PREFORM AND PREFORM ORIENTATION APPARATUS

[75] Inventors: Richard M. Unterlander, Holland Landing; Ronald William Ingram, Toronto; Lou L. Fior, Caledon East; Peter Kamka, Palgrave; Marc Joseph Jaspar, Bolton; Sam S. Baron, North York; Kevin T. Yang, Waterloo, all of Canada

[73] Assignee: Husky Injection Molding Systems Ltd., Canada

[21] Appl. No.: 417,827

[22] Filed: Apr. 6, 1995

Related U.S. Application Data

[62] Division of Ser. No. 235,977, May 2, 1994, Pat. No. 5,498,152.

[51] Int. Cl.$^6$ ............................... B65D 1/00; B29C 49/00
[52] U.S. Cl. .................. 428/35.7; 428/36.9; 428/542.8; 215/382; 215/384; 264/512; 264/523
[58] Field of Search ..................... 428/542.8, 35.7, 428/36.7, 36.8, 36.9, 36.91, 36.92; 215/379, 374, 375, 382, 384; 264/523, 532, 537, 512

[56] References Cited

U.S. PATENT DOCUMENTS

| | | | |
|---|---|---|---|
| 2,707,547 | 5/1955 | Gewcke | 198/394 |
| 3,109,530 | 11/1963 | McPherson | 198/383 |
| 3,297,134 | 1/1967 | Pastuszak | 198/379 |
| 3,576,247 | 4/1971 | Caulford | 198/394 |
| 4,212,841 | 7/1980 | Michel | 264/530 |
| 4,233,010 | 11/1980 | Suzuki | 425/143 |
| 4,483,436 | 11/1984 | Krishnakumar et al. | 198/295 |
| 4,649,068 | 3/1987 | Collette | 428/542.8 |
| 4,928,835 | 5/1990 | Collette et al. | 428/35.7 |
| 4,979,631 | 12/1990 | Krishnaukumar et al. | 215/379 |
| 5,035,603 | 7/1991 | Unterlander et al. | 425/522 |
| 5,282,526 | 2/1994 | Gibbemeyer | 198/376 |
| 5,366,774 | 11/1994 | Pinto et al. | 428/36.92 |

FOREIGN PATENT DOCUMENTS

| | | |
|---|---|---|
| 2529177 | 6/1982 | France . |
| 2537903 | 12/1982 | France . |
| 2126185 | 3/1984 | United Kingdom . |

*Primary Examiner*—Rena Dye
*Attorney, Agent, or Firm*—Bachman & LaPointe, P.C.

[57] ABSTRACT

An inventive orientation apparatus is provided in the present invention preferably for use with blow molding operations. The apparatus includes an object having a body portion and a neck portion. The neck portion has an outer peripheral surface and an alignment lug which extends outwardly from the peripheral surface and past the same. Additionally, a rotating support is included for supporting the object and causing the same to rotate, wherein the rotating support is movable with a moving carrier pallet. The apparatus also includes an orientating element located adjacent the carrier which engages the alignment lug on the object and stops the rotation of the object at a desired orientation. The invention may also include an orientation check device which is positioned upstream from the orientation element, adjacent the carrier, which is used for checking the orientation of the alignment lug for preventing a system jam.

16 Claims, 9 Drawing Sheets

PREFORM AND PREFORM ORIENTATION APPARATUS

This is a Division, of application Ser. No. 08/235,977, filed May 2, 1994, now U.S. Pat. No. 5,498,152.

BACKGROUND OF THE INVENTION

The instant invention is related to molding operations, and more particularly to an apparatus and preform specifically designed for obtaining proper orientation of the preform prior to its transport into a blow mold.

During molding operations, a preform or the like is typically moved through the system so that various operations can be formed on it. Due to cost considerations and various mechanical limitations which inherently exist within most systems, it is necessary that the preform be presented to the particular operations in a usable orientation. That is, it is generally not cost effective to present a preform in a random orientation and orientate the machine relative to the preform. As a result, efforts have been made to orientate the preform prior to its presentation to the various operations comprising the system. For example, orientation of a preform for blow molding operations is frequently required when a thread on a blown bottle or the like must be accurately located in order to position a closure thereon.

In blow molding operations, either a single stage or a two-stage process can be used for facilitating the molding of a preform for forming a container or other article. The two-stage process has a particular advantage over the one stage process. That is, the injection molding and the blow molding operations can be individually and separately designed to optimize the efficiency of each. In one stage processes, efficiency must generally be compromised in either one of the blow molding or injection molding operations steps since they are directly coupled. However, one stage blow molding processes are generally capable of maintaining the angular orientation of a preform for presentation to the blow mold, because the operations in the one stage process do not release the preform. This allows for orientation to be maintained between the injection molding and blow molding operations.

The two-stage process, by definition, requires that the preforms are released, which results in a loss of orientation. Further, the reheating and conditioning processes involved in a two-stage process are normally carried out by rotating the preforms as they pass through a system of ovens. Therefore, orientation is also lost through rotational movement. Such loss in orientation is only avoidable by using complex and expensive self aligning mechanisms which are generally not cost justified. For two-stage blow molding operations and for other operations requiring the orientation of articles, the prior art does include apparatuses and systems for accomplishing the orientation of articles. Generally, however, these apparatuses are complex and inapplicable to existing machinery without major alterations thereto.

U.S. Pat. No. 4,483,436 to Krishnakumar et al. describes a preform holding apparatus consisting of a bore through a pallet in which a rotatable collet is located for retaining the neck of a preform. The preform is retained in the collet by a spring loaded arrangement of detent balls which engage a circumferential groove between the flange and the thread of the preform. To retain the preform, the detent balls must pass over the molded threads to engage the groove. The preform rotates with the collet which is frictionally driven as it moves through ovens or the like. While this apparatus teaches a means for engaging and retaining a preform by its neck for a two-stage injection blow molding process, it does not disclose how to properly orientate the preform for the various operations. This apparatus also has potential for damaging the neck finish of the preform since the detent balls must be forced over the threaded portion.

U.S. Pat. No. 4,664,248 discloses a device and method for orientating blown articles carried randomly by individual pucks on a belt conveyor. The pucks have integral means for engaging the blown articles and for holding the same in a desired orientation. Such means consists of a peripheral slide surface positioned parallel to the desired direction of travel and a rotation producing surface positioned between the base of the puck and the slide surface. Each puck is necessarily rotated for acquiring the desired orientation. For a two stage blow molding operation, additional components would have to be assembled and positioned in order to orientate the pucks and then transport the pucks to the multiple cavities of the blow mold. Orientation would have to be accomplished for each puck after movement through the ovens, thereby requiring individual orientation mechanisms and making such a device particularly complex and expensive.

U.S. Pat. No. 3,576,247 to Caulford et al. describes a method of orientating metal cans. The method and mechanism uses a thick seam on the bottom of the can in order to establish the orientation. Extending walls of the cans are secured by a channel within a guide. The channel is slightly narrower than the thickness of the wall of the container at the location of the seam. The channel guide is formed in a pallet which is carried by a conveyor which moves adjacent a mechanism which induces rotation to the cans. As the can is rotated, the portion of the extended can wall having the larger thickness is caused to abut the outer edge of the channel. As such, the can is prevented from further rotation and this orientation of the can is used as a reference. The Caulford device uses a portion inherent in the can structure for facilitating the proper orientation. As such, the device is limited for use with cans having these thicker seams.

U.S. Pat. No. 4,212,841 to Michel discloses a device for manufacturing hollow thermoplastic articles. In this apparatus, preforms are produced from thermoplastic materials by a molding operation. Each preform is formed with a false neck having at least one positioning lug thereon. The positioning lug on the false neck is used to orientate the preform in an angular position relative to the blow mold such that the blow mold may properly engage the preform. Orientation of the preform via the positioning lug is carried out by a series of grippers which first rotate the preform for engagement by a second series of grippers which stop the rotation of the preform and engage the positioning lug. The series of grippers used for stopping rotation are movable relative to the preforms and must establish position relative to each presented preform to engage a positioning lug. In accordance with these requirements, both the rotation inducing grippers and the rotation stopping grippers include somewhat complex mechanical designs and electrical circuits. The apparatus disclosed in the Michel patent requires that the system be specifically designed for use with the positioning grippers. That is, such a system would be hard to incorporate into already existing machinery. In addition, because of the use of the false neck in the Michel apparatus, additional steps requiring the removal of the false neck must be taken at some point which increases cycle time and expense in forming the final product.

U.S. Pat. No. 5,282,526 to Gibbemeyer discloses a method for orientating container preforms. The apparatus disclosed uses a plurality of pallets which support pairs of rotating mandrels for moving preforms, closed end down, to and through an orientation station. At the orientation station, the preforms are rotated with the mandrels, via individual rotary drive means, until an individual pawl engages a notch on each preform. Each pawl engagement is detected by a limit switch on each mandrel. Once all the pawls are engaged, a bumper is lowered by an actuator to engage a brake assembly which, when engaged, prevents further rotation of the mandrels. After the first pawl engages the first notch, a slip clutch is used which allows the drive motor to continue to rotate while associated drive elements stop. The actuator is then retracted to allow the pallets and mandrels to be released. This apparatus is complex and requires that the pallets be stopped at the orientation stations for the individual stations to orientate the preform. The necessity to stop the pallets for orientation presents problems in incorporating this design into continuous motion automated systems. Due to the individualized treatment necessary for orientating each preform on each pallet, the orientation station includes a complex arrangement of moving parts. Also, because orientation takes place at a stopped position, orientation is a lengthier process than it would be with continuous motion machines.

There exists a need in the blow molding art, for a simple and economical system for fully orientating freely rotatable preforms for and prior to their presentation to a blow mold, wherein the system can be used with different sized and shaped preforms and with current systems by relying significantly on the design of the preform.

SUMMARY OF THE INVENTION

The primary object of this invention is to provide a cost effective system and process for orientating preforms or other objects prior to their presentation to a blow mold.

Another object of this invention is to provide a system and process for orientating preforms or other objects wherein the orientation can be established just prior to the blow molding step while allowing the preform to randomly rotate in conditioning steps preceding the blow mold.

Still another object of this invention is to provide a system and process for orientating preforms or other objects based in large part on the specific design of the preform or object and not on the carriers for the objects.

Still another object of this invention is to provide for a system and process for substantially non monitored and simplified orientation of an object or preform on a support or mandrel.

Still another object of this invention is to provide a system and process for orientating preforms or other objects in bulk fashion prior to the presentation of the preforms or object for additional operations using a substantially stationary orientation device.

Still another object of this invention is to provide an orientation system and process which can be easily adapted to blow molding systems or the like requiring orientation of objects or preforms or the like.

Still another object of this invention is to provide a preform having a specific design adapted for being moved to the desired orientation via the system disclosed herein.

The foregoing objects are attained by the inventive orientation apparatus of the present invention which broadly includes an object having an outer peripheral surface with an alignment means extending outwardly therefrom. A rotating support means is included for holding the object and causing it to rotate, while also being movable with a moving carrier pallet. The apparatus also includes orientation means located adjacent the carrier pallets which engages the alignment means of the object to stop the rotation of the object at a desired orientation. The invention may also include an orientation check means which is positioned upstream from the orientation means, adjacent the moving pallets. If the alignment means is not properly orientated for presentation to the orientation means, the check means operates to allow the realignment as necessary to prevent a system jam.

This invention may also broadly include a preform. The preform broadly includes a body portion having an outer peripheral surface and an alignment means extending from the body portion for permitting the alignment of the preform to a specific orientation via the alignment means. The alignment means is preferably clearly distinguishable from a thread, extending from the body portion outwardly beyond the peripheral surface of the object.

One embodiment of this invention includes the object being a preform and the alignment means being lugs extending from the periphery of the preform. The rotating support means is comprised of a rotatable mandrel and spindle assembly for holding and rotating the object. This embodiment also includes the orientation means being a guide located adjacent the carrier pallets which is adapted to engage the lugs of the object and stop the object from rotating at a desired orientation. The desired orientation is such that the object properly engages a mold used in a blow molding step. The orientation check means may be comprised of a resilient and pivotal cam. Accordingly, the bumper is designed to pivot away from the object for allowing the same to become properly oriented prior to contacting the orientation guide The details of the present invention are set out in the following description and drawings wherein like reference characters depict like elements.

DETAILED DESCRIPTION OF THE PREFERRED EMBODIMENT

Figure 1:
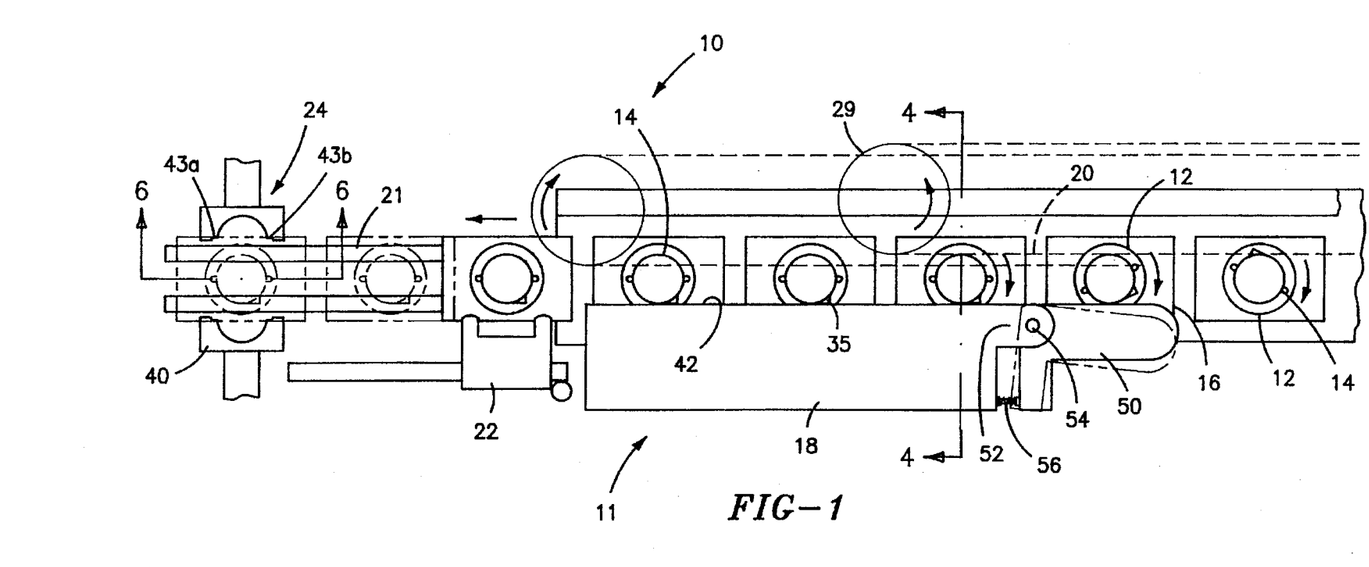
FIG. 1 is an overhead view of a molding system using the orientation apparatus in accordance with the principles of the present invention.

Referring now to the drawings in detail, there is shown in FIG. 1 an overhead view of a blow mold orientation system 10 including an orientation apparatus, designated generally as 11. Orientation apparatus 11 includes a plurality of rotatable mandrels 12, a plurality of objects or preforms 14, a conveying pallet 16, an orientation guide 18 and a spin chain 20.

The system 10 shown in FIG. 1 includes, in addition to the orientation apparatus 11, a shuttle mechanism 22 and a blow molding station 24. Blow mold station 24 preferably includes a mold of the type where the mold halves or mold portions relatively move toward the preform which may be located at a central position between the halves. Other designs, however, could be used. In accordance with system 10, pallets 16 operate to move rotating mandrels 12 and rotating preforms 14 adjacent orientation guide 18. Orientation guide 18 engages preform 14 and discontinues rotation of the same at a desired orientation. Preforms 14 on mandrels 12 are moved via shuttle 22 and pallets 16 to blow molding station 24 where the preforms are blow molded to a desired shape.

Figure 2:
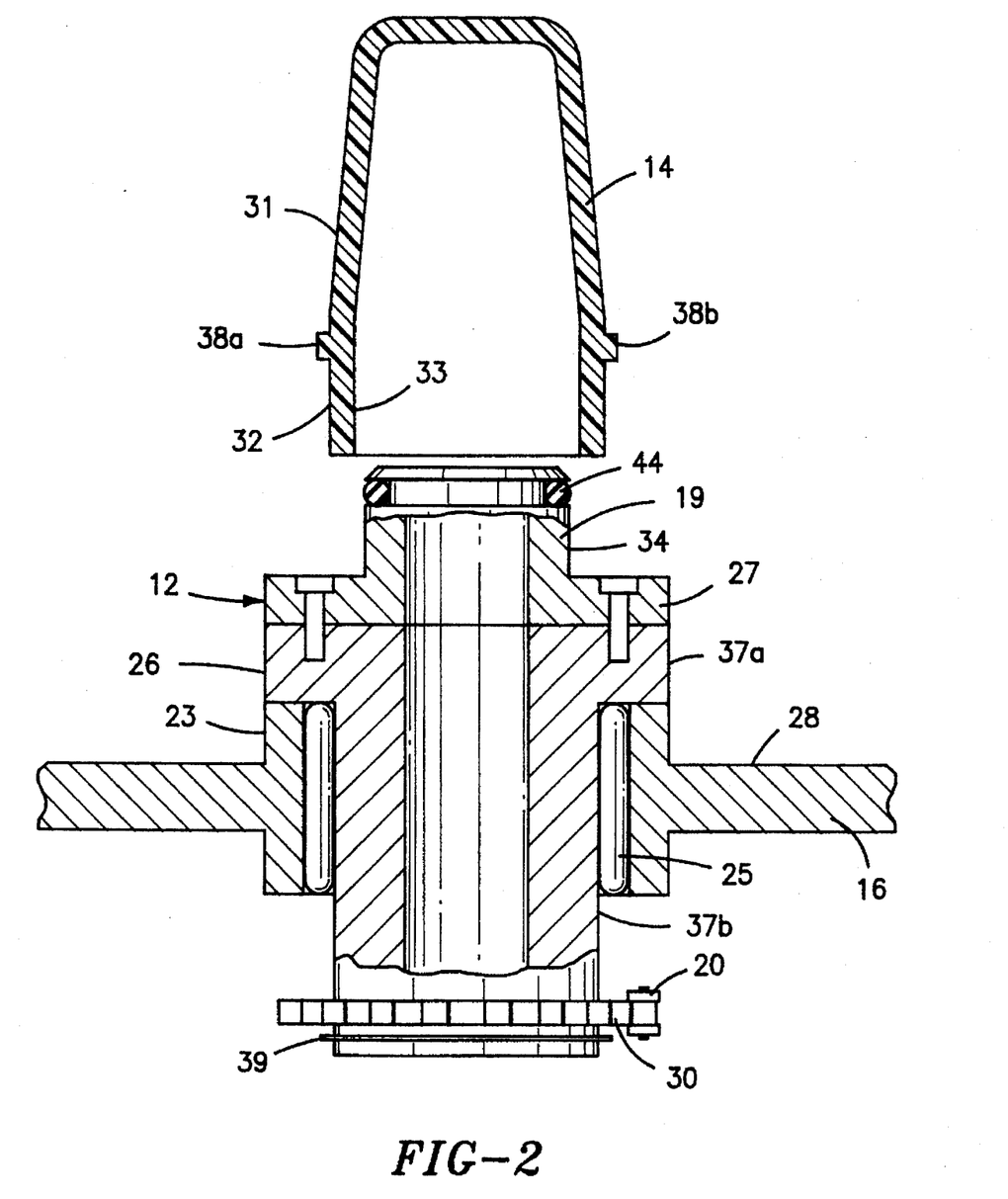
FIG. 2 is a front elevational and partial cross sectional view of a plastic preform, a carrier mandrel, conveying pallet and spindle assembly.

Transportation of preforms 14 through the various conditioning processes and through the orientation process of molding system 10 is accomplished via pallets 16, shown in FIGS. 1 and 2. Pallets 16 are substantially rectangular in shape, although other shapes can be used, and are slidably connected with guides 21. Referring to FIG. 2, each of pallets 16 preferably has a cylindrical portion 23 extending above and below a central rectangular portion. The cylindrical portion has a hole therein for supporting a rotatable spindle bearing 25 and spindle 26 which holds a mandrel 12 onto which preform 14 is mounted. Rotatable spindles 26 and mandrels 12 freely rotate via spin chain 20 throughout the conditioning operations as well as the orientation operation. Each pallet could include more than one rotatable spindle 26 and consequently, more than one mandrel and preform. Generally, the number of mandrels 12 on pallet 16 corresponds to the number of cavities in the blow mold.

Apparatus 11 preferably includes a plurality of pallet, mandrel and preform assemblies. While the following description refers to one such assembly, it is understood that the description is equally applicable to each of such assemblies comprising the system.

Referring still to FIG. 2, the mechanical relationship between each mandrel 12, preform 14, conveying pallet 16 and spin chain 20 is shown. Mandrel 12 is comprised of an upper cylindrical body portion 19 and a flange portion 27. Cylindrical body portion 19 has a close tolerance fit with inner diameter of preform 14. As a result of this fit, preform 14 is allowed to controllably rotate with mandrel 12 upon the application of a rotatable force from spin chain 20 to mandrel 12. Flange 27 rests on and is fastened via fasteners to a top surface of a substantially cylindrical spindle 26. Spindle 26 has a large diameter portion 37a and a smaller diameter portion 37b. Smaller diameter portion 37b fits within a spindle bearing 25 which is press fit into cylindrical extension 23 of pallet 16. The edge separating the small and large diameter portions of spindle 26 rests in upper surface of spindle bearing 25, while spindle 26 is installed therein. Small diameter portion 37b extends through spindle bearing 25 to the underside of pallet 16.

A sprocket 30 is keyed to the bottom end of small diameter portion 37b of spindle 26, as shown in FIG. 2, for engaging spin chain 20. A retaining ring 39 is snapped on to spindle 26 under sprocket 30 for holding the same on spindle 26. Spin chain 20 is preferably driven by a sprocket 29 or the like connected with a drive, not shown and engages a sprocket 30 located adjacent the bottom end of mandrel 12, for rotating the same. Other arrangements such as a belt or rotary disc arrangement, as shown in U.S. Pat. No. 4,233,010, can be used for inducing rotation to mandrels 12. As can be seen from FIG. 2, mandrel 12 and spindle 26 have a passageway formed through the center of each for the flow of air or the like from the bottom of spindle 26 and upwards into preform 14 to blow the same into the shape of a blow mold.

Figure 3:
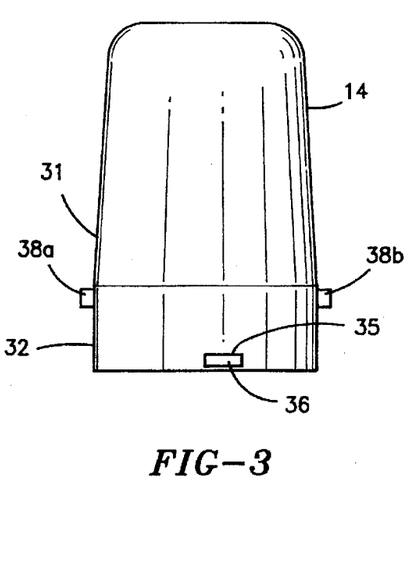
FIG. 3 is an elevational view of the preform of the present invention showing both a primary alignment lug and clamping lugs.

Referring to FIGS. 2 and 3, preform 14 has a substantially cylindrically shaped body portion 31 and a cylindrically shaped neck portion 32. However, the shape of the body portion of the preform is determined by the shape of the final article. Orientation apparatus 10 can be used with any shape preform. Along the inside of neck portion 32, inner cylindrical surface 33 engages mandrel 12 along a cylindrical bearing surface 34. The diameter of inner cylindrical surface 33 of preform 14 is such that a minimal clearance is maintained between cylindrical surface 33 and bearing surface 34 of mandrel 12, causing the close tolerance fit. Accordingly, as mandrel 12 is rotated, and prior to the engagement of preform 14 with orientation guide 18, preform 14 rotates along with mandrel 12. However, because of the sliding fit, when preform 14 discontinues rotation, mandrel 12 will continue rotation in an adjacent manner. Therefore, when preform 14 is engaged via orientation guide 18, preform 14 discontinues rotation while mandrel 12 continues to rotate until released by spin chain 20. Preform 14 may also include threads or seams thereon as necessary for forming the preform and using the same.

Because preform 14 is properly orientated with respect to blow molding station 24 just prior to presentation thereto, pre-orientation of preform 14 onto mandrel 12 is not a concern. That is, preform 14 is initially placed on mandrel 12 without concern of angular orientation and orientation is established, as discussed below, via orientation guide 18.

Figure 4:
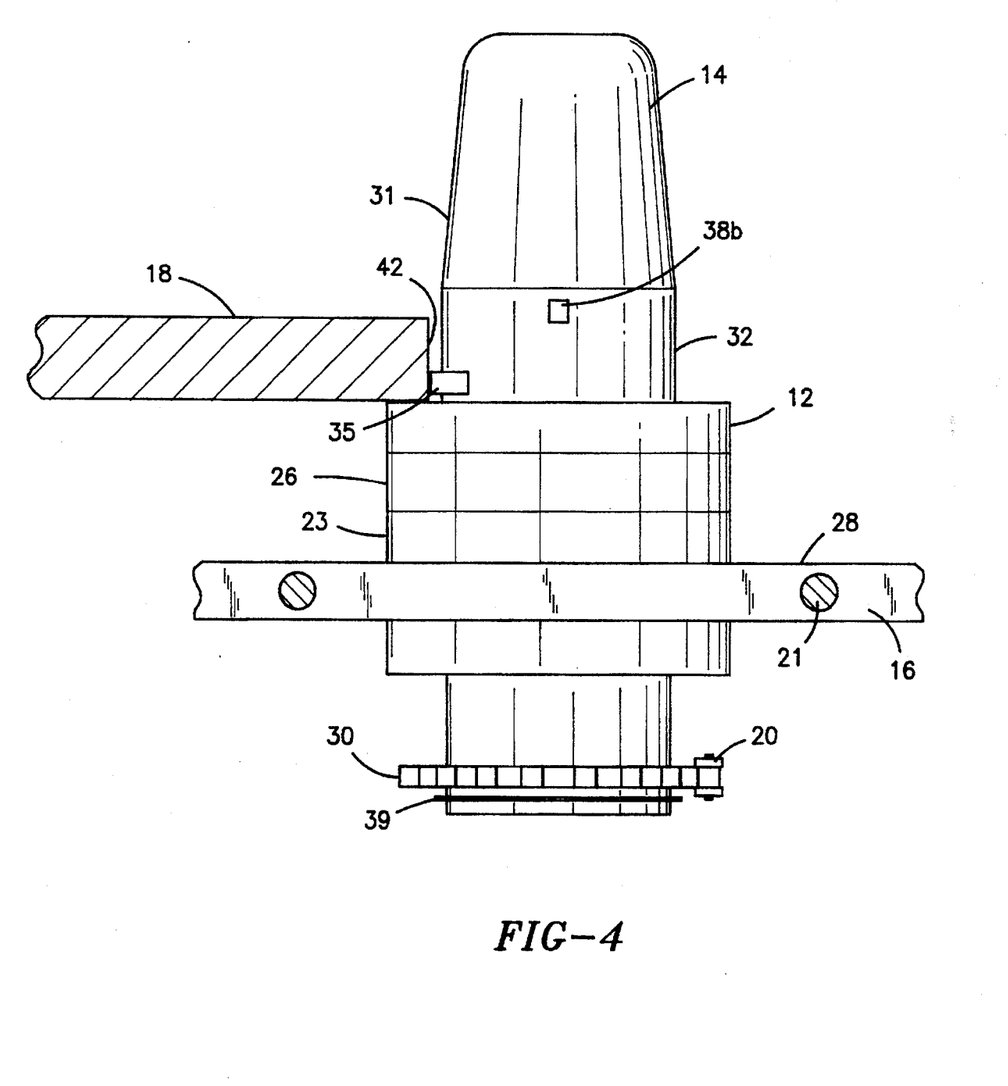
FIG. 4 is an elevational and partial cross sectional view taken along line 4—4 of FIG. 1.
Figure 5:
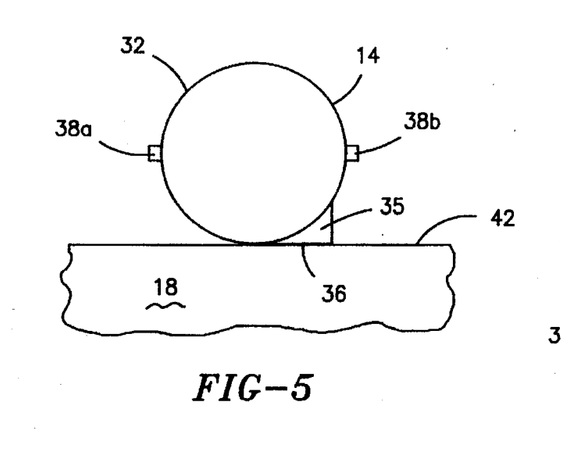
FIG. 5 is an overhead view showing the tangential relationship between the primary alignment lug and an orientation guide.

Referring now to FIGS. 3–5, the outer surface of neck portion 32 of preform 14 includes two distinct sets of lugs. A primary alignment lug 35 is used for orientating preform 14, for proper presentation to shuttle mechanism 22 and blow mold station 24. Alignment lug 35 extends outwardly from the periphery of neck portion 32 of preform 14. From an overhead view, as shown in FIG. 5, alignment lug 35 has a substantially triangular shape with a flat frontward surface 36 located in a plane substantially tangential with the outer circumference of neck portion 32 of preform 14. However, the specific shape of alignment lug 35 is not particularly critical.

Figure 6:
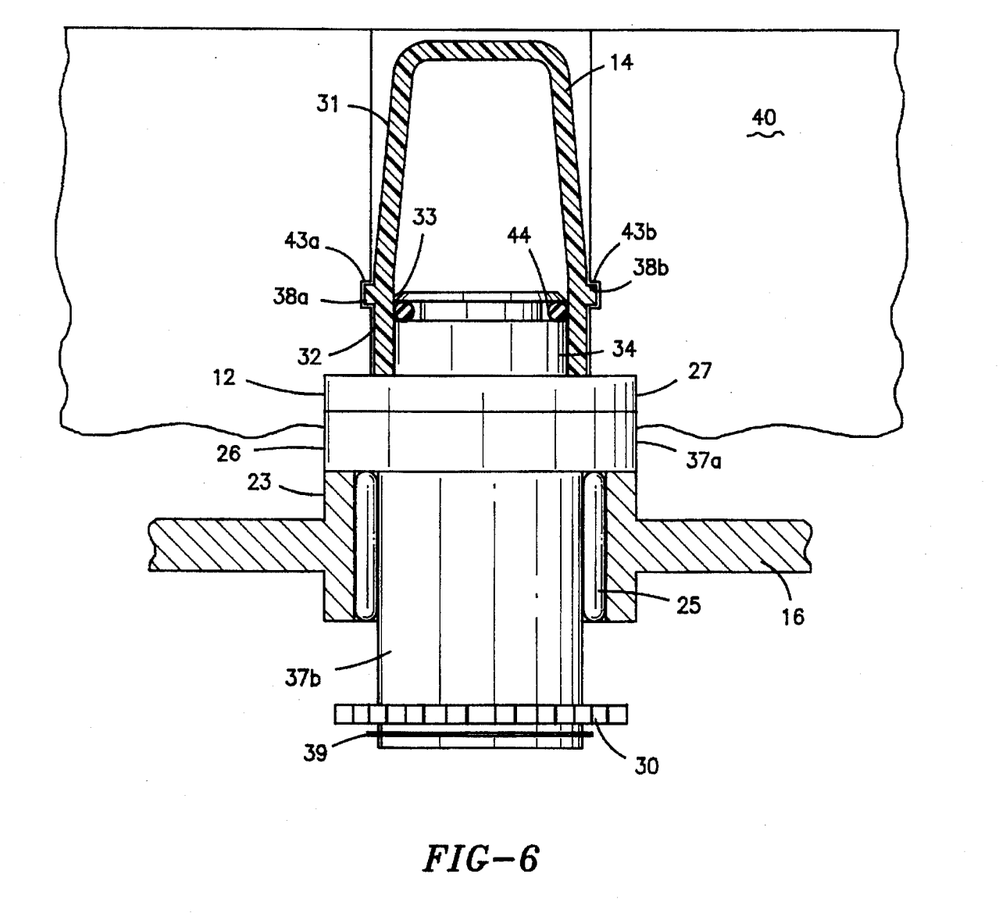
FIG. 6 is an elevational and partial cross sectional view of the preform and mandrel in a blow mold taken along line 6—6 of FIG. 1.

In addition to alignment lug 35, preform 14 also includes a set of clamping lugs 38a and 38b used for causing proper engagement of preform 14 with mold 40, see FIG. 6, of blow mold station 24. Clamping lugs 38a and 38b are substantially rectangular in shape and located on opposite sides of preform 14, extending outwardly therefrom. However, the specific shape of clamping lugs 38a and 38b is not particularly critical. Alignment lug 35 and clamping lugs 38a and 38b are separated in the vertical direction, as shown in FIG. 3, on the surface of neck portion 32. Primary alignment lug 35 is preferably located below clamping lugs 38a and 38b.

FIGS. 4 and 5 show that the discontinued rotation and proper alignment of preform 14, are accomplished from orientation guide 18 engaging primary alignment lug 35. Orientation guide 18 is comprised of a substantially rectangularly shaped block of rigid material having its elongated sides parallel to the direction of movement of pallet 16. However, differently configured movement paths of the pallet and mandrel assemblies may require alternative configurations of the orientation guide. That is, the movement path does not have to be in a straight line and thus, orientation guide 18 would need to be appropriately configured to follow the movement path of the preform closely. Orientation guide 18 is preferably rigidly attached to the frame of system 10.

As shown in FIG. 4, flange 27 of mandrel 12 passes in part under orientation guide 18 when rotatably moving toward blow mold station 24. Orientation guide 18 has an inner wall 42 which is spaced from surface 28 of conveying pallet 16 and which extends into the path of rotating preform 14. Inner wall 42, of orientation guide 18 is the portion of orientation guide 18 which engages alignment lug 35 and should be shaped to follow the shape of neck portion 32. Orientation guide 18 is positioned on the frame of apparatus 11 and relative to mandrel 12, such that the top surface of orientation guide 18 is below clamping lugs 38a and 38b and the lower surface of orientation guide 18 is even with or below the upper surface of primary alignment lug 35. Consequently, orientation guide 18 engages primary alignment lug 35 without engaging clamping lugs 38a and 38b.

As mandrel 12 is conveyed toward blow mold station 24, flange 27 passes under orientation guide 18 while the outer wall of neck portion 32 of preform 14 passes adjacently to, but spaced from wall 42. As mandrel 12 and preform 14 are rotated into the area of orientation guide 18, orientation guide 18 engages primary alignment lug 35. That is, because neck portion 32 is substantially adjacent wall 42 of orientation guide 18, and because alignment lug 35 extends out beyond the periphery of neck portion 32, as shown in FIG. 5, alignment lug 35 is rotated into a collision with wall 42.

After the collision is made between alignment lug 35 and wall 42, preform 14 discontinues rotation such that clamping lugs 38a and 38b are substantially parallel with the direction of movement of conveying pallets 16, as shown in FIG. 5. For different applications, it may be desirable to stop the rotation such that engagement lugs 38a and 38b are orientated other than parallel the direction of movement. This can be accomplished by placing alignment lug 35 at an another location on preform 14, relative to clamping lugs 38a and 38b. Prior to being transported out of contact with orientation guide 18, mandrel 12 is disengaged from spin chain 20, as shown in FIG. 1, thereby leaving preform 14 in the same desired orientation it acquired when rotation was stopped by orientation guide 18. In accordance with the purpose of this apparatus, preform 14 remains in proper alignment for presentation to and engagement with blow mold 40. In this orientation, preforms 14 are moved into shuttle mechanism 22 and onward to blow mold station 24.

Clamping lugs 38a and 38b are shaped and positioned to engage recesses 43a and 43b, respectively, in blow mold 40, as shown in FIG. 1 and FIG. 6, so as to guarantee proper mold/preform alignment. Mold 40 is designed so as not to engage primary alignment lug 35. Substantial error in the pre-orientation of clamping lugs 38a and 38b can be tolerated by mold 40 since the mandrel 12 and/or preform 14 are still free to rotate. That is, for example, if clamping lugs 38a and 38b are angularly aligned relative to the direction of movement, blow mold 40 will function to rotate preform 14 and position clamping lugs 38a and 38b for aligned engagement with recesses 43a and 43b. Mold 40 may be designed such that recesses 43a and 43b are split between the mold halves, as shown in FIG. 1. Alternatively, each of the mold halves may be designed to include an entire recess for engaging one of preform clamping lugs 38a and 38b, wherein the mating portion of the other mold halve is a surface without a recess. As such, the lugs are not clamped between the halves but are trapped therebetween.

Referring to FIG. 6, for the purpose of the blow molding operation, mandrel 12 also includes an inset O-ring 44 which functions to cause a seal during the blow molding process. Prior to blow molding, as shown in FIG. 2, O-ring 44 is set into a groove on upper bearing surface portion 34 of mandrel 12, but does not extend outwardly from the circumference of bearing surface 34 before blowing. As such, the added friction usually existing in prior art arrangements between mandrels and rotating preforms due to O-rings is avoided while still establishing a seal during the blow molding process.

During blow molding and as shown in FIG. 6, a proper seal is established with assistance from the minimal gap between mandrel 12 and preform 14. Accordingly, during the blow molding process at station 24, air is blown into the open end of preform 14 and escapes via the gap between mandrel 12 and preform 14. As air is forced through the gap, based on the design of the groove in mandrel 12 and the positioning of O-ring 44, the air is forced behind O-ring 44, thereby pushing it outward against preform 14 and forming the necessary seal to allow blow molding of preform 14. As soon as the fluid pressure is released, O-ring 44 returns to its original position in the groove, as shown in FIG. 2. As a result, the seal is only present during the blow molding process and does not add unnecessary friction between mandrel 12 and preform 14. Free spinning is therefore allowed prior to molding.

Figure 7:
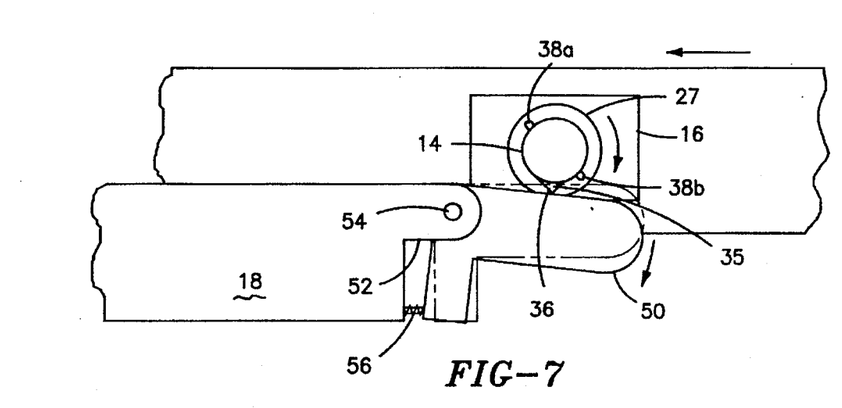
FIG. 7 is an overhead view showing an orientation check cam for preventing system jams.

Referring now to FIG. 7, and to FIG. 1, orientation apparatus 11 may also include a resilient orientation check cam 50 for prealigning preform 14 prior to presentation to orientation guide 18. As shown in FIG. 7, in some situations, preform 14 may be presented in an orientation wherein primary alignment lug 35 is positioned relative to orientation guide 18 such that it is somewhere between tangential contact and being free and clear from orientation guide 18. As such, if primary lug 35 approaches orientation check cam 50 on a collision course therewith, orientation check cam 50 is designed to flex away from preform 14 so as to allow preform 14 to assume a free and clear alignment prior to presentation to orientation guide 18.

Accordingly, orientation check cam 50 is preferably L-shaped and pivotally attached to an extended portion 52 of orientation guide 18 via a pin 54 or the like. The intersection of the arms comprising the L-shape is the point of pivotal attachment. A load sensing spring 56 is positioned between orientation guide 18 and the leg of check cam 50 which is substantially perpendicular to the direction of travel of preforms 14. Consequently, orientation check cam 50 can flex in accordance with forces associated with improperly presented preforms and return to a position in substantial alignment with orientation guide 18, after the proper orientation of preform 14 is established.

After passing by both orientation check cam 50 and orientation guide 18, preform 14 is in proper orientation for presentation to shuttle mechanism 22 and onward to blow mold station 24. After mandrel 12 is released from spin chain 20, it is moved into shuttle mechanism 22. Upon movement into shuttle mechanism 22, mandrel 12 and properly aligned preform 14 are shifted into the mold 40 of blow mold station 24. Clamping lugs 38a and 38b are preferably positioned, as shown in FIG. 1, for engagement with mold 40.

Figure 8:
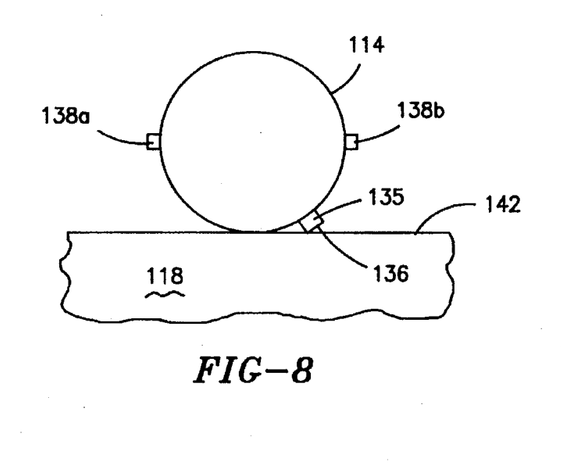
FIG. 8 is an overhead view of an alternative embodiment of a preform and primary alignment lug.
Figure 9:
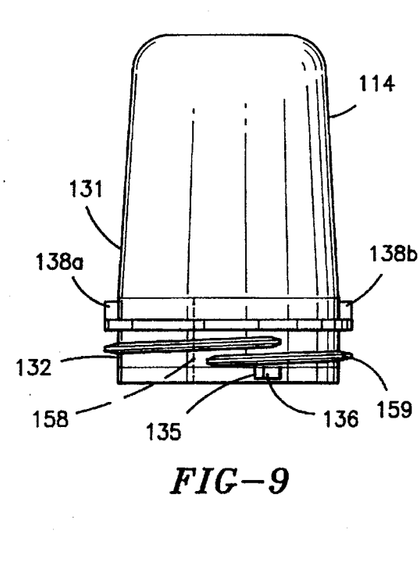
FIG. 9 is an elevational view of the alternative embodiment of the preform shown in FIG. 8.

Another embodiment of preform 14 and primary alignment lug 35 is shown in FIGS. 8 and 9. As shown in FIG. 8, the alignment lug 135 also extends past the periphery of lower neck portion 132 of preform 114, see FIG. 3, but is substantially rectangular in shape. Therefore, unlike the first embodiment, lug 35, the corner of lug 135 engages wall 142 of orientation guide 118, as opposed to flat surface 36 of primary alignment lug 35. As with the first embodiment, a seam 158 may be used in forming preform 114 and an optional thread 159 may be included for engaging preform 114 with a closure.

Figure 10:
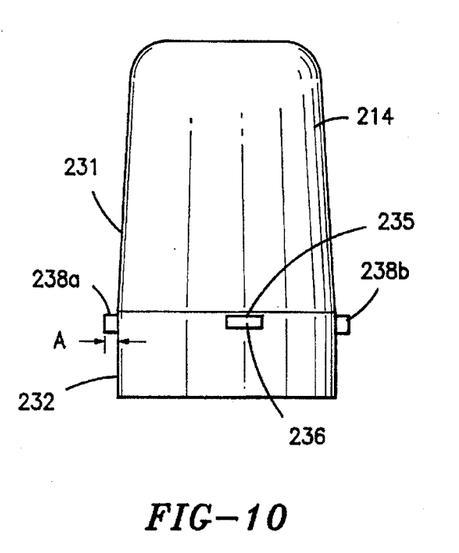
FIG. 10 is an elevational view of a second alternative embodiment of the preform and lugs.
Figure 11:
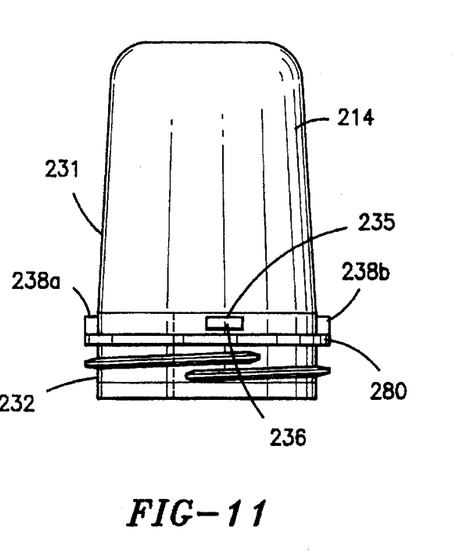
FIG. 11 is a view similar to FIG. 10 showing the second alternative embodiment with threads.
Figure 12:
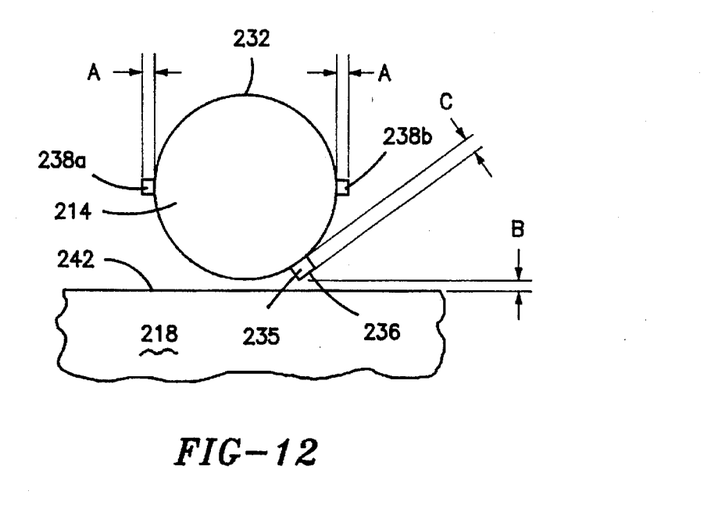
FIG. 12 is an overhead view of the second alternative embodiment of the preform.

Referring now to FIGS. 10-12, a second alternative embodiment of the preform is shown as preform 214. The difference between preform 214 and the original embodiment, preform 14, is the location of the primary alignment lug 235 on neck portion 232 relative to clamping lugs 238a and 238b. In this embodiment, as shown in FIGS. 10 and 11, alignment lug 235 is positioned at substantially the same vertical plane as clamping lugs 238a and 238b on neck portion 232. Accordingly, with the lugs on the same level, more freedom is provided for the design of the remaining area of the neck finish. That is, substantially more of the neck area can be devoted to other desired or required features, resulting in minimal interference by the location of alignment lug 235, and clamping lugs 238a and 238b. Naturally, alignment lug 235 and clamping lugs 238a and 238b can be located on or be a part of the other features of neck portion 232, such as, for example, ring 280, shown in FIG. 11.

Referring to FIG. 12, apparatus 11 can function properly with the lugs sharing the same plane by having alignment lug 235 extend radially beyond the radial extent of all other preform features at the same level, including clamping lugs 238a and 238b. Accordingly, and as shown FIG. 12, the distance indicated by "C", the radial extent of alignment lug 235 measured from neck 232, is larger than the distance indicated by "A", the radial extent of clamping lugs 238a and 238b measured from neck 232.

In addition, orientation guide 218 should be positioned just beyond the radial extent of every preform feature, including clamping lugs 238a and 238b, except alignment lug 235. Accordingly, the distance indicated by "B", the position of wall 242 measured radially from the neck 232 of preform 214, is greater than the distance indicated by "A", the radial extent of clamping lugs 238a and 238b, and the distance indicated by "B" is less than the distance indicated by "C", the radial extent of alignment lug 235. As such, only one lug, the furthest extending alignment lug 235, can collide with guide 218.

Therefore, with the distances being such that "A"<"B"<"C", alignment lugs 235 can be on the same vertical plane as clamping lugs 238a and 238b while apparatus 11 functions as required.

Figure 13:
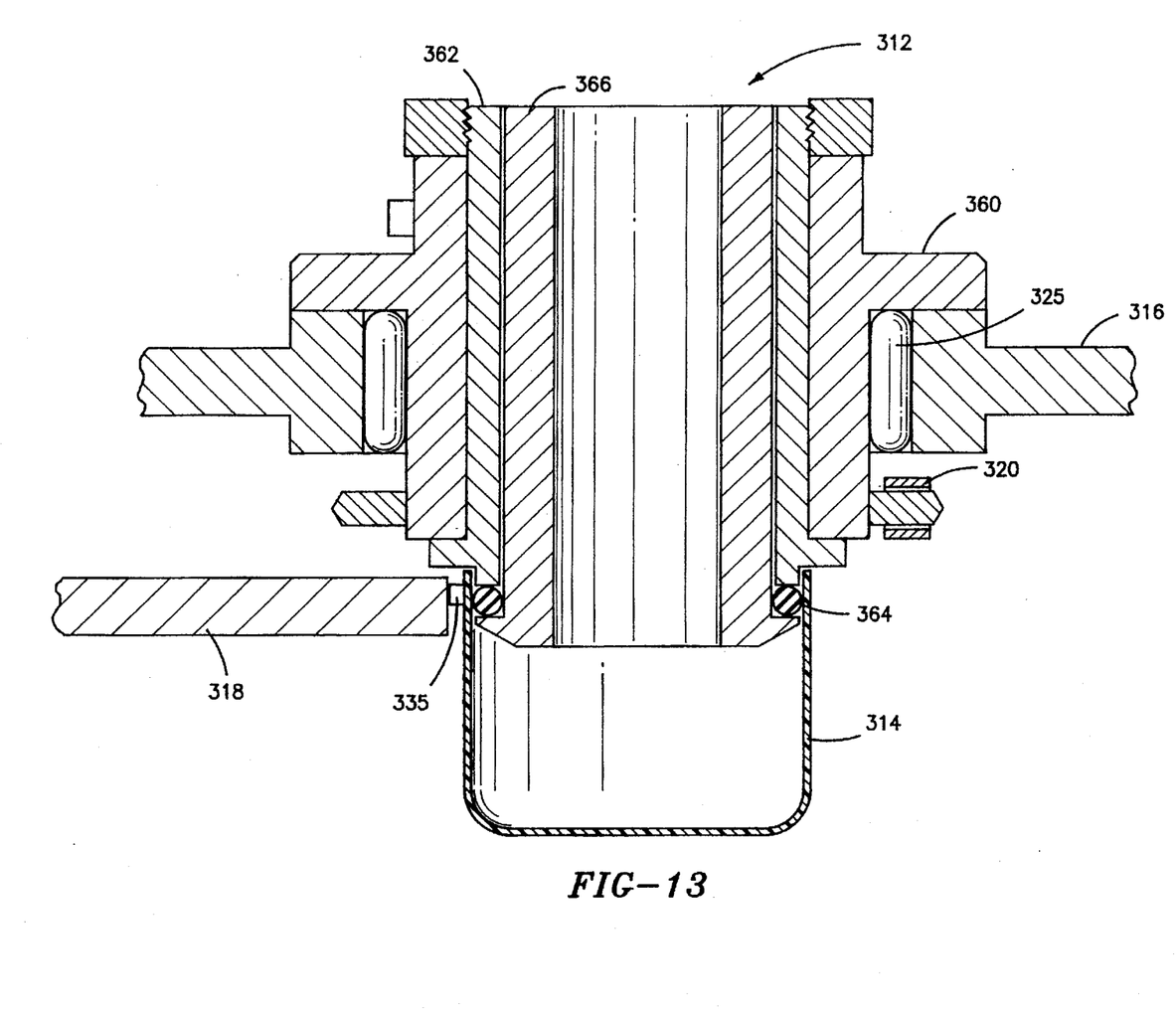
FIG. 13 is a cross sectional view of an alternative embodiment of a mandrel and a preform.

An alternative embodiment of the preform and mandrel designs is shown in FIG. 13. This embodiment is for use with blow molding machines which blow preforms with the neck of the preform facing upward. Carrier mandrel 312 is rotatably supported on pallet 316 in a rotatable bearing 325 and rotated by spin chain 320 substantially as discussed above. Mandrel 312 includes an outer portion 360 and a rotatably attached inner portion 362. Preform 314 is fixedly attached to inner portion 362, as shown in FIG. 13 by the compression of an expanding retaining O-ring 364 or the like, against the inner surface of preform 314 via a locking sleeve 366. Locking sleeve 366 extends the length of inner portion 362 and presses O-ring 364 against preform 314 for holding the same on mandrel 312.

Mandrel 312, including inner and outer portions 360 and 362, respectively, are rotatably attached to pallet 316 so that as they pass through the ovens, the inner and outer portions and the preform rotate as a single unit. Preform 314 similarly includes a primary alignment lug 335 which, when engaged by orientation guide 318, causes both inner portion 362 and preform 314 to stop rotation and acquire the desired alignment for presentation to a blow mold. Preform 314 also includes clamping lugs (not shown) for properly engaging preform 314 with a blow mold (not shown).

Figure 14:
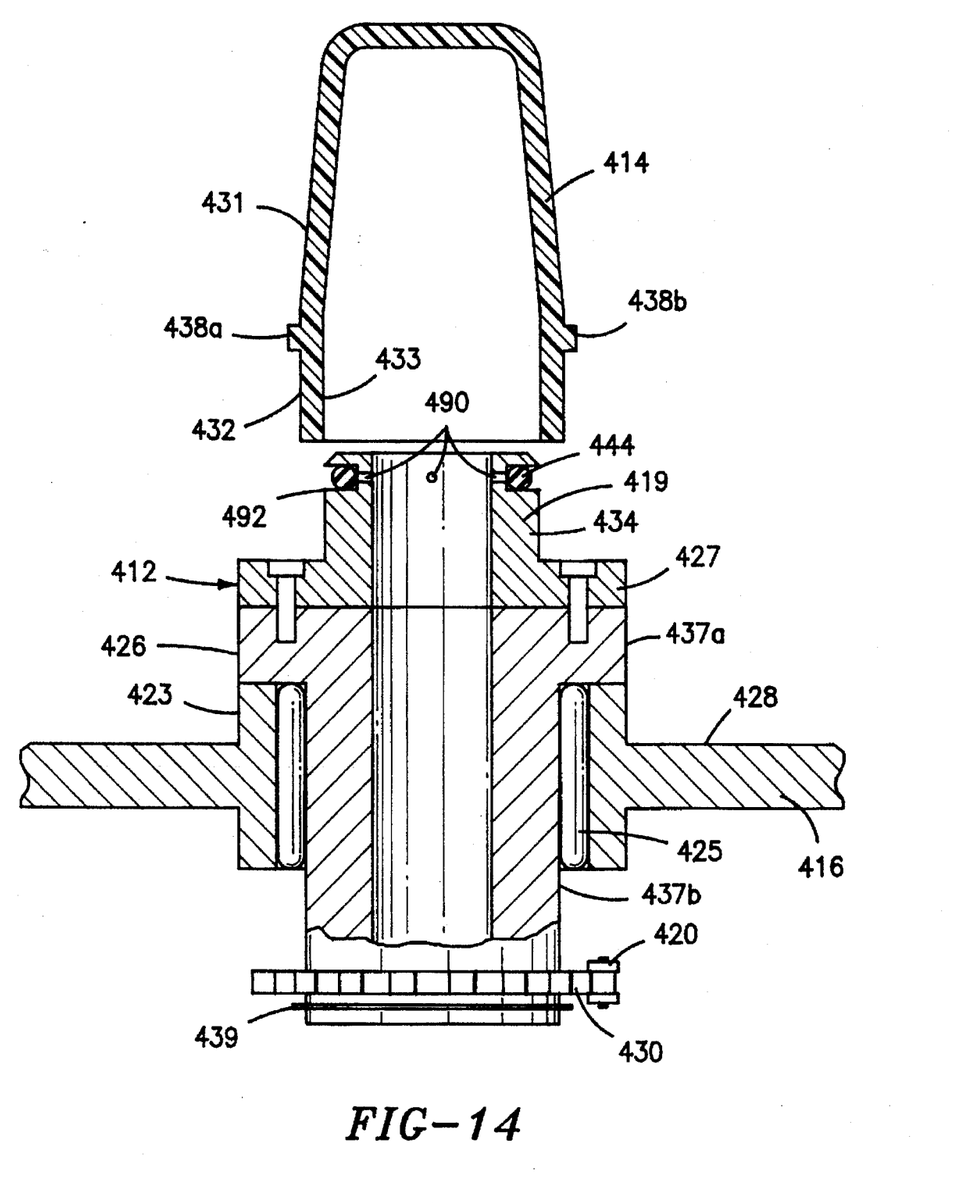
FIG. 14 is an elevational view of another alternative embodiment of the mandrel, assembled with the preform, spindle and pallet.

Referring to FIG. 14, another alternative embodiment of the mandrel is shown as mandrel 412. As indicated by the reference numbers being similar to the main embodiment, the only structural change is the inclusion of holes 490 extending into O-ring groove 492 from the cavity area of mandrel 412. Holes 490 function to direct the fluid flow from the blow mold into the cavity against the back side of O-ring 444. Accordingly, O-ring 444 is forced partially out of groove 492, beyond the periphery of mandrel 412 and into contact with preform 414, such as indicated in FIG. 6, but generally more effectively. With the assistance of the fluid flow being directed directly against the back side of O-ring 444, a fluid tight seal is formed between O-ring 444, mandrel 412 and preform 414 so that preform 414 is properly and efficiently blown into shape.

Figure 15:
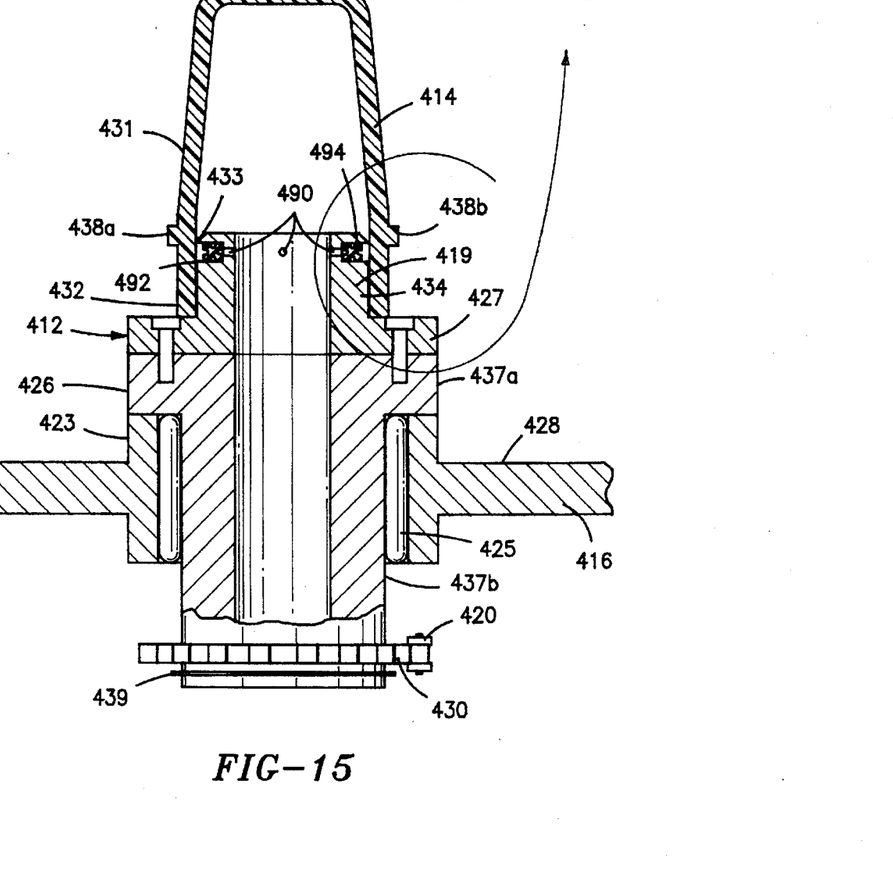
FIG. 15 is an elevational view similar to FIG. 14 using an alternative quad-ring in replace of the O-ring.
Figure 15A:
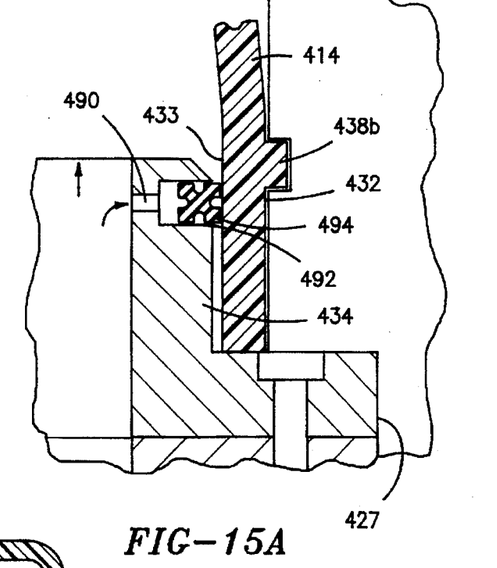
FIG. 15a is an enlarged cross sectional view taken from FIG. 15 with the mandrel using the quad-ring and positioned in the mold.

As a more effective alternative to O-ring 444, a quad-ring 494 can be used, as shown in FIG. 15 and in the enlarged view in FIG. 15a, which is more susceptible to movement out of groove 492 via the back fluid pressure from holes 490. Quad-ring 494 is formed from four walls each having squared upper and lower edges and each having a semi-circular recess extending centrally around its periphery. Groove 492 is sized for a close tolerance fit with quad-ring 494. As a result, when fluid flow is introduced into preform 414 while it is positioned in mold 440, as indicated by the arrows in FIG. 15a, the substantially rectangular and partially recessed wall of quad-ring 494 immediately adjacent holes 490 acts as a piston and does not allow fluid to flow around the ring as may occur with the circularly shaped O-ring. Consequently, more efficient use of the fluid is attained and quad-ring 494 is generally, relative to O-ring 444, more effectively pushed out of groove 492.

The process of orientating preform 12 has been apparent through the above description but will be summarized as follows. While preform 12 is particularly discussed, it is understood that the process description applies equally to preforms 114, 214 and 314.

After being transported through conditioning ovens, via conveyor pallets or the like, preforms 14 are prepared for stretched-blow molding. Rotation inducing spin chain 20 or other similar device continues to engage mandrel 12, at a lower end thereof for rotating the same, while the mandrel 12 and preform 14 are transported adjacent orientation guide 18 and toward blow mold station 24 via pallet 16. Pallet 16 is moved via a chain or belt drive mechanism or other suitable device, toward blow mold station 24.

While being transported and rotated, preform 14 is placed into proper orientation for presentation to blow mold station 24 via orientation guide 18. Orientation guide 18 extends into the movement path of mandrel 12 and preform 14 and engages a primary alignment lug 35 of preform 14. The engagement of orientation guide 18 with primary alignment lug 35 ceases the rotation of preform 14. After rotation is stopped, mandrel 12 is disengaged from spin chain 20 and transferred via reciprocating shuttle mechanism 22, in the desired orientation, into blow mold station 24. Blow mold 40 closes symmetrically about preform 14, engaging clamping lugs 38a and 38b via recesses 43a and 43b, respectively, finally positioning preform 14 and holding it for blow molding. Clamping lugs 38a and 38b are used for properly engaging preform 14 with mold 40.

The primary advantage of this invention is that a cost effective system and process are provided for orientating preforms or other objects prior to their presentation to a blow mold. Another advantage of this invention is that a system and process are provided for orientating preforms or other objects wherein the orientation can be established just prior to the blow molding step while allowing the preform to randomly rotate in conditioning steps preceding the blow mold. Still another advantage of this invention is that a system and process are provided which allows for substantially non monitored and simplified orientation of an object or preform on a support or mandrel. Still another advantage is that a system and process are provided which can be easily adapted to existing blow molding systems or the like requiring orientation of objects or preforms or the like. Another advantage is that a system and process are provided for orientating preforms or other objects based in large part on the specific design of the preform or object. Yet another advantage is that a system and process are provided for orientating preforms or other objects in bulk fashion prior to the presentation of the preforms or objects to a molding operation. Still another advantage of the invention is that a preform is provided having a specific design adapted to be moved to a desired orientation via the system disclosed herein.

It is apparent that there has been provided in accordance with this invention a preform and preform orientation apparatus which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A preform for use in a blow molder wherein said preform is adapted to be aligned to a desired orientation via an alignment mechanism in preparation for said blow molder, comprising:

a body portion and a neck portion, said neck portion being continuous with and nonseparable from said body portion, said neck portion having an outer peripheral surface;

alignment means operative for radially aligning said preform to a specific orientation in conjunction with said alignment mechanism, said alignment means extending outwardly from said outer peripheral surface and having a non-continuous circumferential length; and wherein said peripheral surface further includes threads, said alignment means being structurally separate from said threads.

2. The preform according to claim 1, wherein said peripheral surface further includes a seam, said alignment means being structurally separate from said seam.

3. The preform according to claim 1, wherein said alignment means is operative for engaging said alignment mechanism and for radially positioning said preform with respect to said alignment mechanism.

4. The preform according to claim 1, wherein said neck portion defines an opening and wherein said alignment means is adjacent the opening.

5. A preform for use in a blow molder wherein said preform is adapted to be aligned to a desired orientation via an alignment mechanism in preparation for said blow molder, comprising:

a body portion and a neck portion, said neck portion being continuous with and nonseparable from said body portion, said neck portion having an outer peripheral surface;

alignment means operative for radially aligning said preform to a specific orientation in conjunction with said alignment mechanism, said alignment means extending outwardly from said outer peripheral surface and having a non-continuous circumferential length;

wherein said peripheral surface further includes threads, said alignment means being structurally separate from said threads; and wherein said alignment means comprises a lug specifically provided for orienting said preform via said alignment mechanism.

6. The preform according to claim 5, wherein said alignment lug has a substantially triangular shape with a flat surface thereof operative for engaging said alignment mechanism.

7. A preform for use in a blow molder wherein said preform is adapted to be aligned to a desired orientation via an alignment mechanism in preparation for said blow molder, comprising:

a body portion and a neck portion, said neck portion being continuous with and nonseparable from said body portion, said neck portion having an outer peripheral surface;

alignment means operative for radially aligning said preform to a specific orientation in conjunction with said alignment mechanism, said alignment means extending outwardly from said outer peripheral surface and having a non-continuous circumferential length;

wherein said peripheral surface further includes threads, said alignment means being structurally separate from said threads;

wherein said alignment means comprises a lug specifically provided for orienting said preform via said alignment mechanism; and clamping means operative for engaging said preform with mating elements of said blow molder, said clamping means extending outwardly from said outer peripheral surface, wherein said clamping means comprises a lug attached to said neck portion.

8. The preform according to claim 7, wherein said alignment means is located on said neck portion at a different level than said clamping means.

9. The preform according to claim 7, wherein said alignment means is positioned on said neck portion at the same level as said clamping means and extends radially outward from said neck portion further than said clamping means.

10. The preform according to claim 7 wherein said outer peripheral surface has a circumference and each of said alignment means and clamping means comprises a radially extending lug extending transversely to said outer peripheral surface of the preform and each of said alignment and clamping means having a non-continuous circumferential length around the circumference of said preform.

11. The preform according to claim 10, wherein each lug is a separate and independent structure.

12. A preform for use in a blow molder wherein said preform is adapted to be aligned to a desired orientation via an alignment mechanism in preparation for said blow molder, comprising:

a body portion and a neck portion, said neck portion being continuous with and nonseparable from said body portion, said neck portion having an outer peripheral surface;

alignment means operative for radially aligning said preform to a specific orientation in conjunction with said alignment mechanism, said alignment means extending outwardly from said outer peripheral surface and having a non-continuous circumferential length;

wherein said peripheral surface further includes threads, said alignment means being structurally separate from said threads;

wherein said alignment means comprises a lug specifically provided for orienting said preform via said alignment mechanism; and clamping means operative for engaging said preform with mating elements of said blow molder, said clamping means extending outwardly from said outer peripheral surface, wherein said clamping means comprises a pair of lugs attached to said neck portion, said lugs being located on opposite sides of said neck portion.

13. The preform according to claim 12, wherein said alignment means is located on said neck portion between said pair of lugs, said alignment means being positioned on said neck portion at the same level as said pair of lugs and extends radially outward from said neck portion further than said pair of lugs.

14. The preform according to claim 12, wherein said alignment means is located on said neck portion between said pair of lugs, said alignment means being positioned on said neck portion at a different level than said pair of lugs.

15. A preform for use in a blow molder wherein said preform is adapted to be aligned to a desired orientation via an alignment mechanism in preparation for said blow molder, comprising:

a body portion and a neck portion, said neck portion being continuous with and nonseparable from said body portion, said neck portion having an outer peripheral surface;

alignment means operative for radially aligning said preform to a specific orientation in conjunction with said alignment mechanism, said alignment means extending outwardly from said outer peripheral surface and having a non-continuous circumferential length;

wherein said peripheral surface further includes threads, said alignment means being structurally separate from said threads;

wherein said alignment means comprises a lug specifically provided for orienting said preform via said alignment mechanism; and clamping means operative for engaging said preform with mating elements of said blow molder, said clamping means extending outwardly from said outer peripheral surface, wherein said alignment means comprises a single lug and said clamping means comprises two lugs, with each of said lugs comprising discrete, spaced apart projections.

16. The preform according to claim 15, wherein said clamping lugs are spaced axially from said alignment lug in the direction of said body portion.

* * * * *